United States Patent
Suzuki et al.

(10) Patent No.: US 6,587,106 B1
(45) Date of Patent: Jul. 1, 2003

(54) COMPUTER GRAPHICS APPARATUS HAVING AN IMPROVED WALK-THROUGH FUNCTION

(75) Inventors: Kaori Suzuki, Kawasaki (JP); Satoshi Kasai, Shizuoka (JP); Hiroshi Kamada, Kawasaki (JP); Katsuhiko Hirota, Kawasaki (JP); Atsuko Tada, Kawasaki (JP); Asako Yumoto, Kawasaki (JP); Kiyoshi Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/021,409

(22) Filed: Feb. 10, 1998

Related U.S. Application Data

(62) Division of application No. 08/405,862, filed on Mar. 17, 1995, now Pat. No. 5,790,950.

(30) Foreign Application Priority Data

Mar. 18, 1994 (JP) .......................................... 06-048477
Mar. 18, 1994 (JP) .......................................... 06-048478

(51) Int. Cl.⁷ .............................................. G06T 11/00
(52) U.S. Cl. ..................................................... 345/428
(58) Field of Search ................................. 345/419, 427, 345/428

(56) References Cited

U.S. PATENT DOCUMENTS

| | | |
|---|---|---|
| 4,580,782 A | 4/1986 | Ochi |
| 5,268,997 A | 12/1993 | Funaki |
| 5,276,785 A | 1/1994 | Mackinlay et al. |
| 5,325,472 A | 6/1994 | Horiuchi et al. |
| 5,442,734 A * | 8/1995 | Murakami et al. .......... 395/127 |
| 5,666,474 A | 9/1997 | Otto |

FOREIGN PATENT DOCUMENTS

JP 4-316193 11/1992

OTHER PUBLICATIONS

Foley, Computer Graphics: Principles and Practice, p. 237–242, 1076–1077.

Young, Fundamentals of Mechanics and Heat, p. 72–74.

* cited by examiner

Primary Examiner—Almis R. Jankus
(74) Attorney, Agent, or Firm—Stass & Halsey LLP

(57) ABSTRACT

A computer graphics apparatus includes a walk-through function to simulate with a computer the concept of walking through a structure such as a building. Display processing time and calculation processing time for one frame of a computer graphic image are improved by an input unit which receives a viewline moving instruction to move a viewline of a computer image. A viewline control unit determines positions and directions of the viewline while a storage unit stores computer graphics data including three-dimensional data of objects, walk-through attribute data and viewline data. An image generation unit then generates images including animated images based on the position of the viewline and the computer graphics data. The resultant images are then displayed on an image display unit.

8 Claims, 22 Drawing Sheets

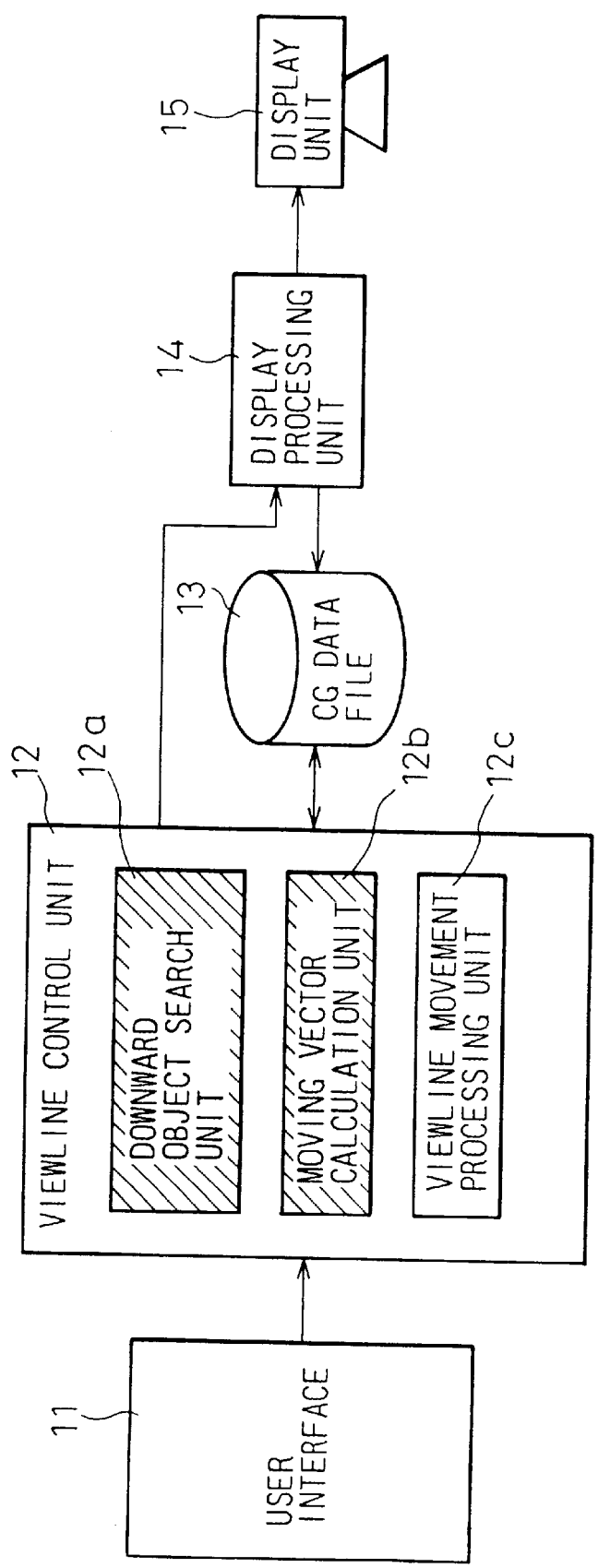

Fig. 4A

| OBJECT DATA | |
|---|---|
| NAME | STAIRS |
| SHAPE | → SHAPE DATA |
| TEXTURE | → TEXTURE |
| WALK-THROUGH ATTRIBUTE | → WALK-THROUGH ATTRIBUTE DATA |
| ----- | --- |

Fig. 4B

| WALK-THROUGH ATTRIBUTE DATA | |
|---|---|
| KIND | FLOOR |
| NORMAL VECTOR | (0,1,1) |

Fig. 4C

| VIEWLINE DATA | |
|---|---|
| VIEWPOINT | (0,0,0) |
| NOTICE POINT | (0,0,100) |
| UP-VECTOR | (0,1,0) |

Fig. 4D

| ENVIRONMENT DATA | |
|---|---|
| GRAVITY VECTOR | (0,-1,0) |

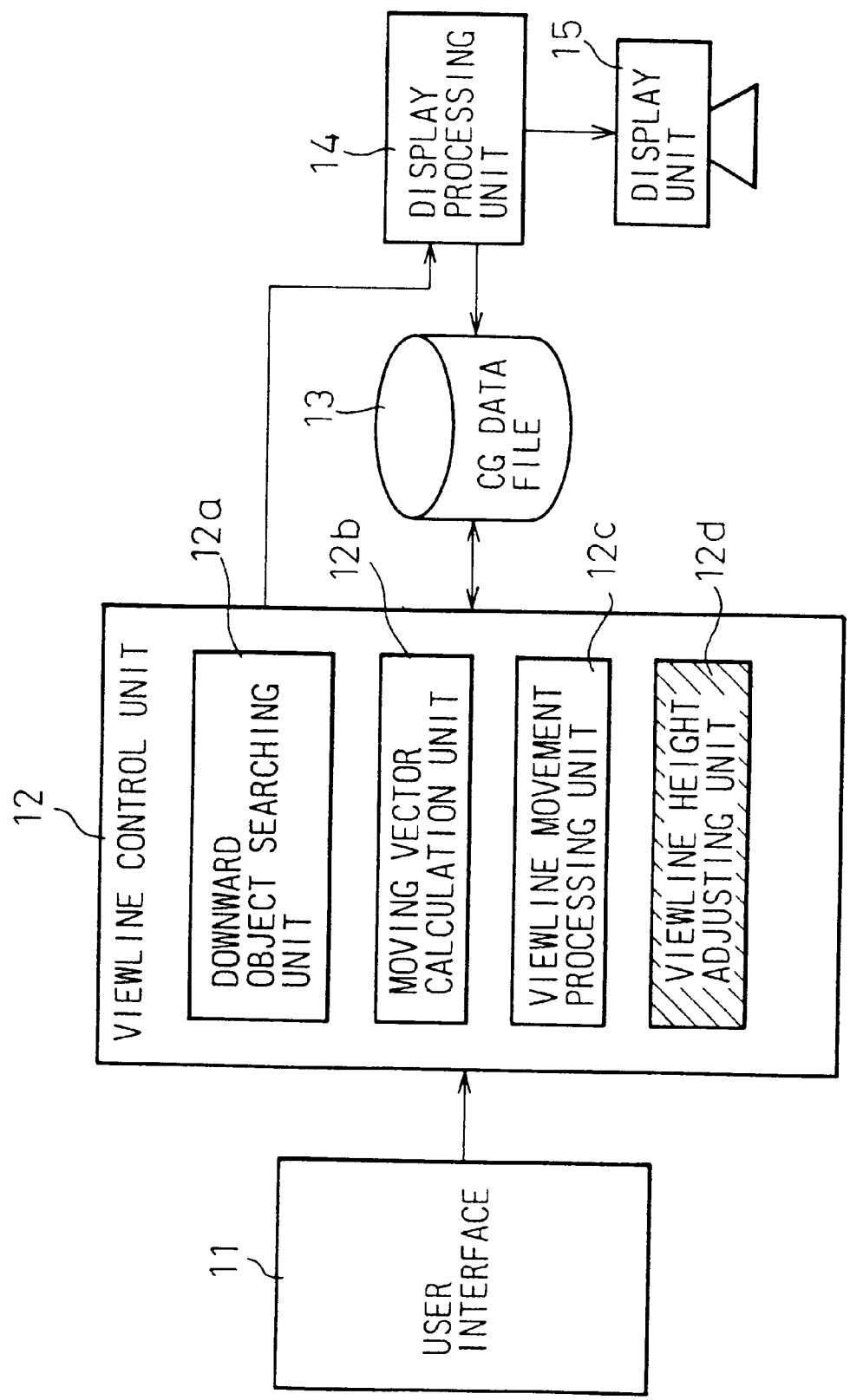

Fig. 6B

| VIEWLINE DATA | |
|---|---|
| VIEWPOINT | (0,0,0) |
| NOTICE POINT | (0,0,100) |
| UP-VECTOR | (0,1,0) |
| HEIGHT | 5.0 |

Fig.9A

| WALK-THROUGH ATTRIBUTE DATA ||
|---|---|
| KIND | WALL |
| NORMAL VECTOR | (1,0,0) |

Fig.9B

| VIEWLINE DATA ||
|---|---|
| VIEWPOINT | (0,0,0) |
| NOTICE POINT | (0,0,100) |
| UP-VECTOR | (0,1,0) |
| HEIGHT | 5.0 |
| VOLUME RADIUS | 1.0 |

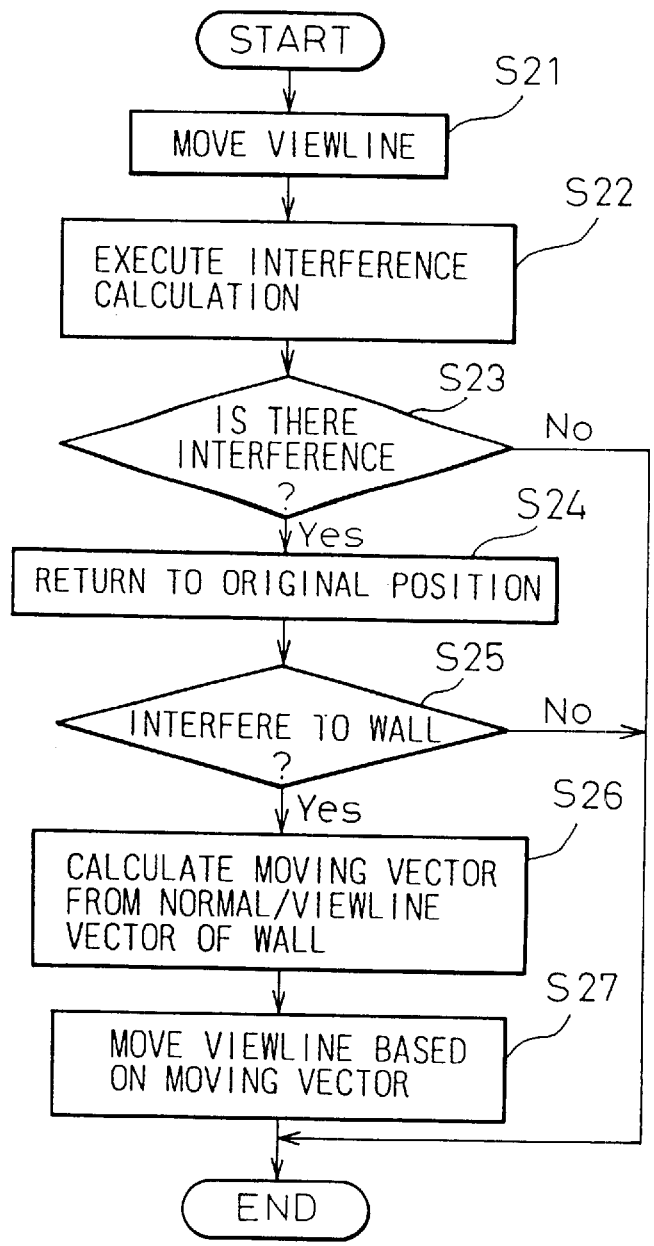

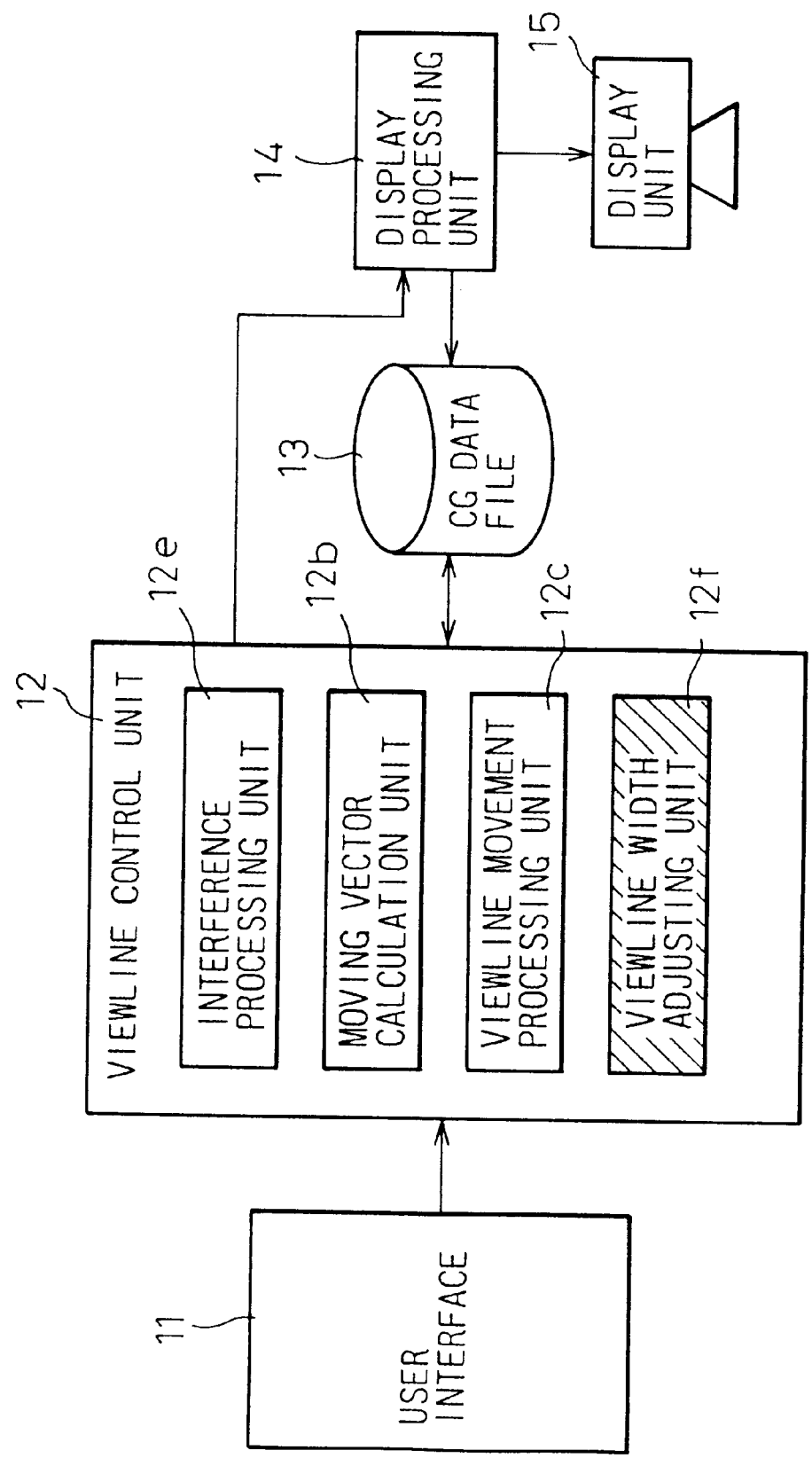

Fig.12B

| VIEWLINE DATA | |
|---|---|
| VIEWPOINT | (0,0,0) |
| NOTICE POINT | (0,0,100) |
| UP-VECTOR | (0,1,0) |
| HEIGHT | 5.0 |
| WIDTH | 1.0 |
| VOLUME RADIUS | 1.0 |

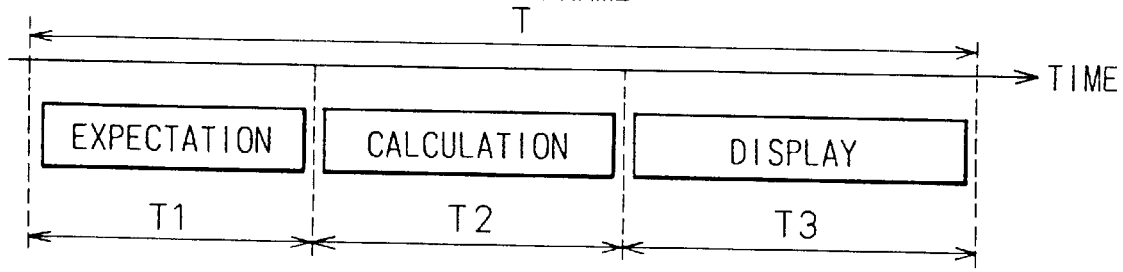
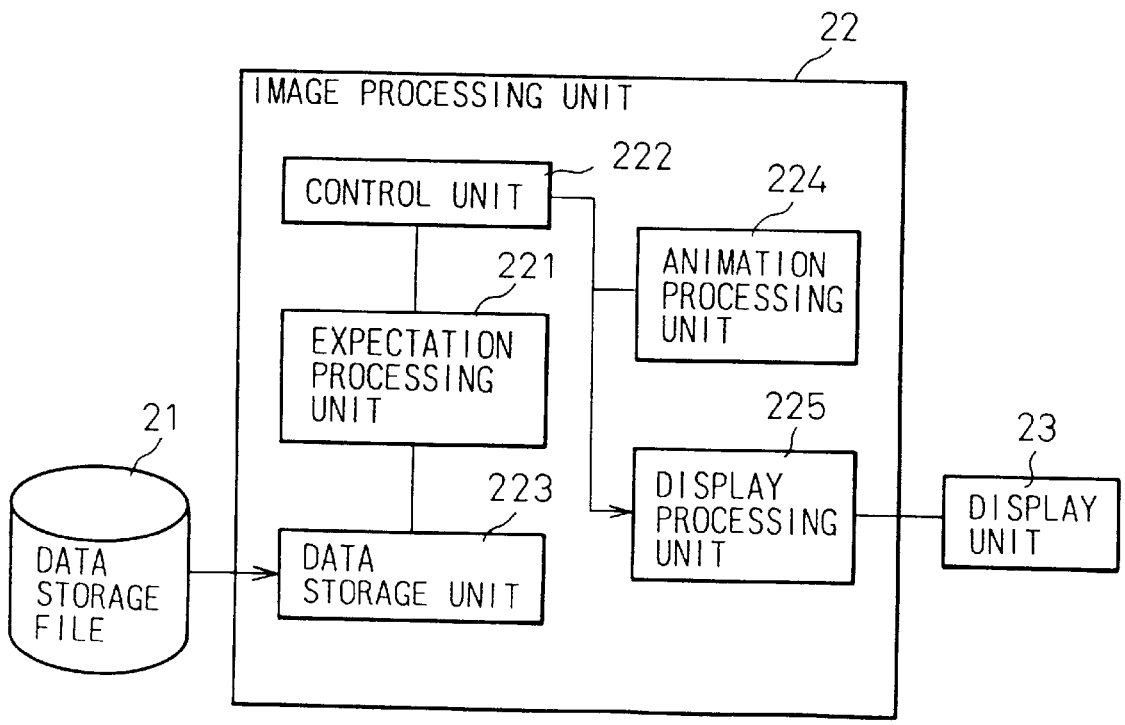

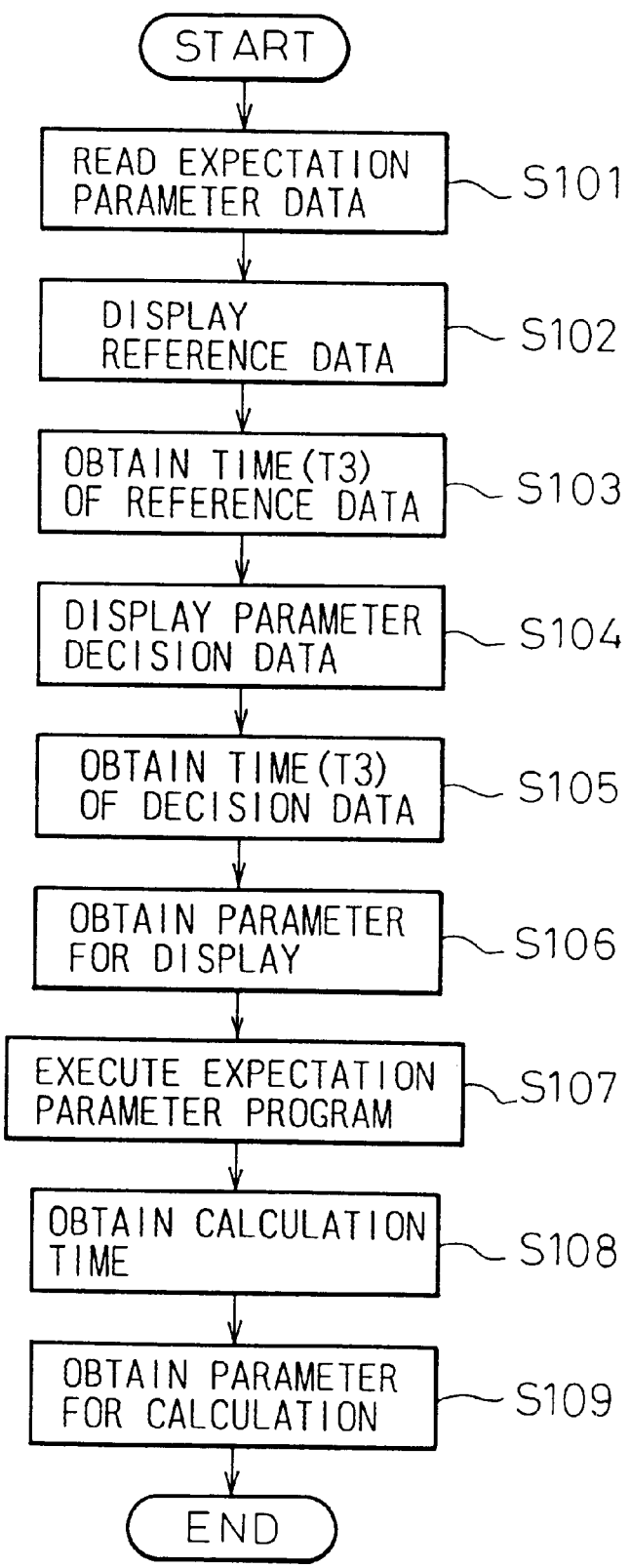

COMPUTER GRAPHICS APPARATUS HAVING AN IMPROVED WALK-THROUGH FUNCTION

This application is a divisional of Application No. 08/405,862, filed Mar. 17, 1992, now issued as U.S. Pat. No. 5,790,950.

BACKGROUND OF THE INVENTION

1. Field of the Invention

The present invention relates to a computer graphics apparatus having an improved walk-through function in which a viewline (or, viewpoint) moves around on a computer graphics display and more particularly an improved function for calculating an expectation time for a calculation processing time and a display procession time of one frame of the computer graphics display.

2. Description of the Related Art

Recently, a computer graphics technique, which generates and processes predetermined patterns and images (these are called "graphics") on a display is widely utilized in various fields, for example, buildings, video games, commercial films, education, etc. Particularly, the walk-through function is a basic function used for the above fields. For example, in the architectural field, it is desired that the viewpoint on the walk-through is close to an actual viewpoint because it is very important for a structural designer to check an outside view of the structure. Further, it is desirable to provide a computer graphics apparatus having simplified handling operations. Still further, it is very important to coincide the calculation processing time with the display processing time in order to obtain smooth animated images which are close to an actual motion.

SUMMARY OF THE INVENTION

The first object of the present invention is to provide an improved walk-through function in order to obtain a viewline which is close to an actual viewline in computer graphics by providing various walk-through attributes to the object.

The second object of the present invention is to provide an improved calculation of an expectation time in order to obtain smooth animated images in computer graphics.

In accordance with the present invention, there is provided a computer graphics apparatus including an input unit for receiving from a user a viewline moving instruction for moving the viewline on computer graphics; a viewline control unit operatively connected to the input unit for determining positions and directions of the viewline on the computer graphics; a storage unit operatively connected to the viewline control unit for storing computer graphics data at least including three-dimensional data of objects, walk-through attribute data and viewline data; an image generation unit operatively connected to the storage unit and the viewline control unit for generating images including animated images based on the position of the viewline and the computer graphics date; and an image display unit operatively connected to the image generation unit for displaying images generated by the image generation unit.

In a preferred embodiment, the viewline control unit comprises a downward object searching unit for searching for objects positioned under the viewline based on the walk-through attribute; a moving vector calculation unit for calculating a moving vector based on the walk-through attribute data and a viewline vector; and a viewline movement processing unit for moving the viewline along with the moving vector.

In another preferred embodiment, the viewline control unit further comprises a viewline height adjusting unit for adjusting the height of the viewline.

In still another preferred embodiment, the viewline control unit further comprises and interference processing unit for checking for a possibility of collision of the viewline with an obstacle when moving the viewline on the computer graphics.

In still another preferred embodiment, the obstacle is a wall as one kind of the walk-through attribute, and the viewline is moved along with the wall when the viewline hits the wall.

In still another preferred embodiment, the interference processing unit holds data which is sorted into two objects in accordance with the different kinds of walk-through attributes, one performing an interference check, and the other not performing the interference check, whereby the numbers of objects performing the interference check are reduced in accordance with the sorted data and the walk-through attributes.

In still another preferred embodiment, the viewline control unit further comprises viewline width adjusting unit for moving the viewline along with the obstacle by keeping a predetermined constant distance from the obstacle.

In still another preferred embodiment, a computer graphics apparatus further comprises a walk-through attribute editing unit operatively connected between the input means and the storage unit for setting the walk-through of the viewline.

In still another preferred embodiment, the image generation unit performs a calculation process for the three-dimensional data, a display process for displaying results of calculation, and expectation process for estimating calculation processing time and display processing time in an expectation processing time; and estimates processing time for one frame of an animated image by summing the expectation processing time, the calculation processing time and the display processing time.

In still another preferred embodiment, the image generation unit obtains the numbers of move-changing data and a method for changing data from the three-dimensional data; obtains an amount of data and kinds thereof from the three-dimensional data; obtains expectation parameters which are previously determined based on above numbers, method, amount and kinds; and calculates the calculation processing time and display processing time based on expectation parameters.

In still another preferred embodiment, the image generation unit estimates the processing time in accordance with change of data from a previous frame.

In still another preferred embodiment, the image generation unit obtains changed data from the previous frame regarding the numbers of move-changing data and a method for changing data from the three-dimensional data; obtains changed data from the previous frame regarding an amount of data and kinds thereof from the three-dimensional data; obtains expectation parameters which are previously determined; and calculates the calculation processing time and display processing time based on expectation parameters.

In still another preferred embodiment, the image generation unit estimates the processing time based on two kinds of data, one being data which changes with time, the other being data which does not change with time, and the processing time based on the latter being set to a reference time.

In still another preferred embodiment, the image generation unit determines the processing time for non-moving objects in a view-volume as the same time of the previous processing time, checks change of number of moving objects in the view-volume, and calculates the processing time in the view-volume.

In still another preferred embodiment, the image generation unit determines the processing time based on the data, which do not change with time, as a just previous actual time.

In still another preferred embodiment, the image generation unit divides a whole three-dimensional data space into a plurality of partial spaces, applies data necessary for expectation to each of the partial spaces, and estimates the processing time.

In still another preferred embodiment, the image eneration unit obtains a volume ratio of a volume of the whole three-dimensional data space and the view-volume, calculates data necessary for expectation based on the volume ratio within the view-volume, and estimates the processing time.

In still another preferred embodiment, the image generation unit obtains a difference between previous expected processing time and an actual processing time, and corrects the expected processing time.

In still another preferred embodiment, the image generation unit comprises an expectation unit and an expectation parameter measuring unit; for reading data for measuring expectation parameters; displaying reference data for display; obtaining the display processing time for the reference data; displaying parameter decision data; obtaining the display processing time for the parameter decision data; obtaining expectation parameters for display process; executing a problem for expectation parameters for calculation process; obtaining calculation processing time; and obtaining the expectation parameters for calculation process.

BRIEF DESCRIPTION OF THE DRAWINGS

In the drawings:

FIG. 3 is a block diagram of a computer graphics apparatus according to a first embodiment of the present invention;

FIGS. 4A to 4D are explanatory views for explaining data stored in the CG data storage;

FIG. 6A is a block diagram of a computer graphics apparatus according to a second embodiment of the present invention;

FIG. 6B is an explanatory view of viewline data;

FIGS. 9A and 9B show an example of walk-through attribute data and viewline data of the third embodiment;

FIG. 10 is a process flowchart of a process in computer graphics apparatus according to the third embodiment;

FIG. 11 is an explanatory view for explaining a sort table of interference process according to a fourth embodiment;

FIG. 12A is a block diagram of a computer graphics apparatus according to a fifth embodiment of the present invention;

FIG. 12B is an explanatory view of viewline data according to the fifth embodiment;

FIG. 16 is an explanatory view for explaining processing time for expectation, calculation and display in computer graphics according to the second aspect of the present invention;

FIG. 17 is a basic block diagram of an image processing unit in a computer graphics according to the second aspect of the present invention;

FIG. 25 is a measuring process flowchart for expectation parameters.

DESCRIPTION OF THE PREFERRED EMBODIMENTS

Figure 15A:
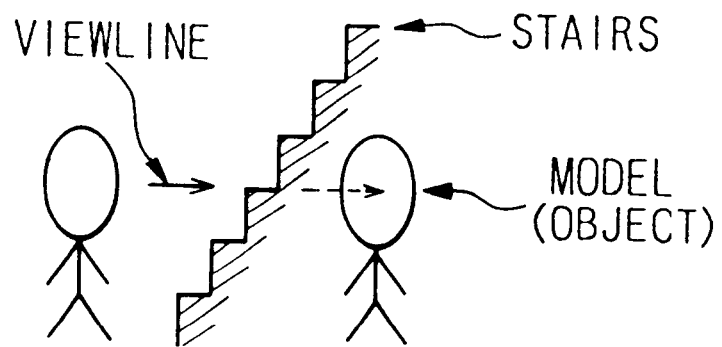
FIGS. 15A and 15B are explanatory views for explaining problems of a conventional walk-through function.
Figure 15B:
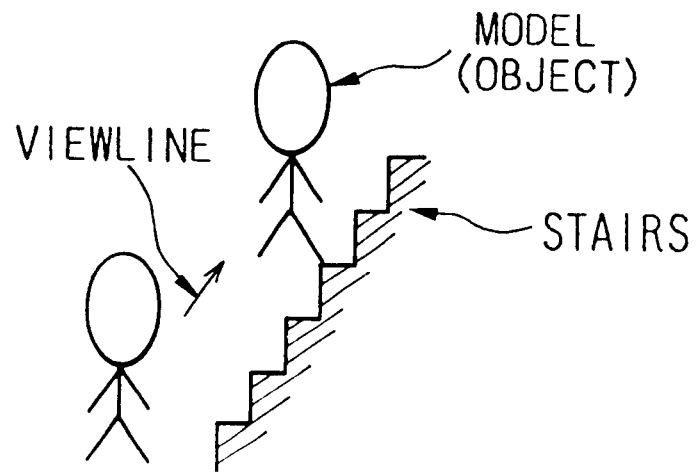

FIGS. 15A and 15B are explanatory views for explaining problems of a conventional walk-through function. In FIGS. 15A and 15B, these drawings explain the case where a walker goes up a set of stairs in a computer graphics display. In FIG. 15A, if the viewline of the walker is fixed to the front, the walker cannot go up the stairs and moves to the right side as shown by an arrow line. Further, if an interference check is executed between the walker and the stairs, the walker must stop in front of the stairs because the stairs are detected as an obstacle. In order to perform the interference check, it is necessary to execute a very complicated calculation.

On the other hand, as shown in FIG. 15B, if the viewline is fixed in a direction along the stairs, the walker may step off from the stairs if the slant of the stairs is changed. Accordingly, in this case, it is necessary to control the viewline so as to coincide with the direction of the stairs.

However, for the first aspect of the present invention, there are some problems in the conventional computer graphics apparatus as follows.

First, it is very difficult to obtain smooth movement toward a target position along with the walk-through because contents of a walk-through attribute are very poor.

Second, since calculation time for the interference check is long, it is very difficult to obtain smooth movement because the animated image does not coincide with an actual motion.

Finally, since the direction of the viewline coincides with the direction of movement, it is very difficult to move when there is an obstacle in front of the direction of movement.

According to the first aspect of the present invention, it is possible to resolve the above problems. In the present invention, various attributes (for example, a floor is defined as an attribute on which the object can walk, and a wall is defined as an attribute through which the object cannot walk) are provided as the walk-through attributes.

Figure 1:
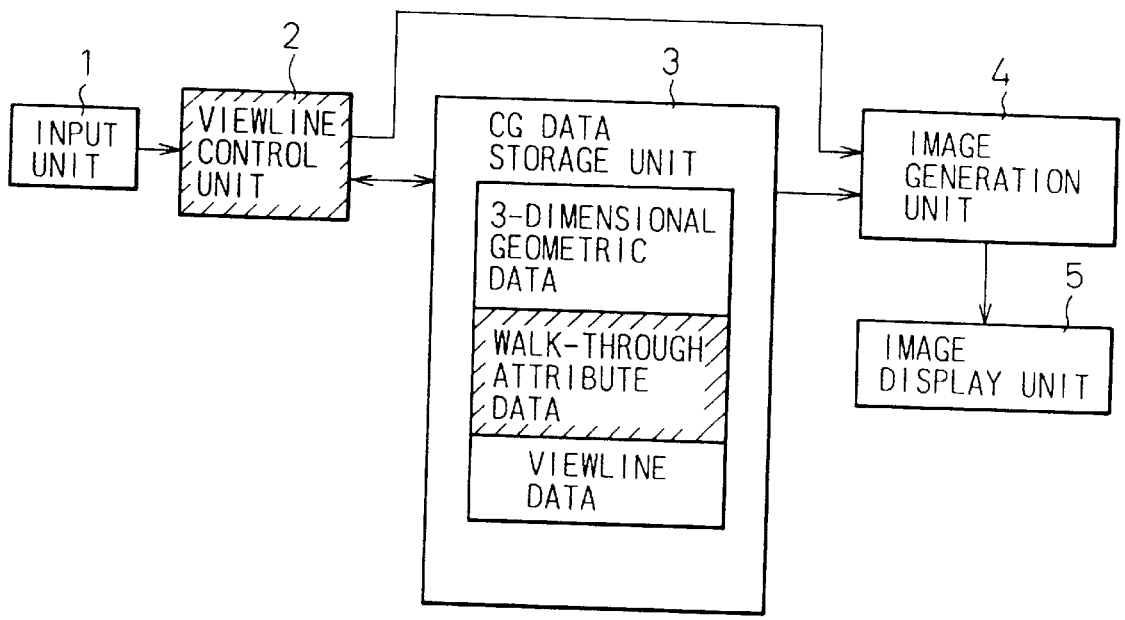
FIG. 1 is a basic block diagram of a computer graphics apparatus according to a first aspect of the present invention.

FIG. 1 is a basic block diagram of a computer graphics apparatus according to the first aspect of the present invention. In FIG. 1, reference number 1 denotes an input unit, 2 a viewline control unit, 3 a CG data storage, 4 an image generating unit, and 5 an image display unit.

The CG data storage unit 3 stores three-dimensional geometric data 31 including a shape and texture of an object, walk-through attribute data 32, and viewline data 33. The input unit 1 receives a walk-through instruction (i.e., an instruction of movement of the viewline) from a user. The viewline control unit 2 determines a location of the viewline in accordance with the walk-through attribute data and the viewline data. Further, the viewline control unit 2 realizes movement of the viewline along with, for example, the stairs, a floor, etc., when moving the viewline, in accordance with instructions to move in the forward or reverse direction supplied by the user which a mouse, a keyboard, etc. The image generating unit 4 generates the image in accordance with the location of the viewline and the three-dimensional geometric data.

In FIG. 1, when the viewline control unit 2 receives an instruction of movement of the viewline from the input unit 1, the viewline control unit 2 obtains a vector indicating a direction of movement (below, movement vector) based on the walk-through attribute data of the object and a vector indicating the viewline (below, viewline vector), separates the moving direction from the viewline direction, and executes the movement of the object in the moving direction.

Figure 2:
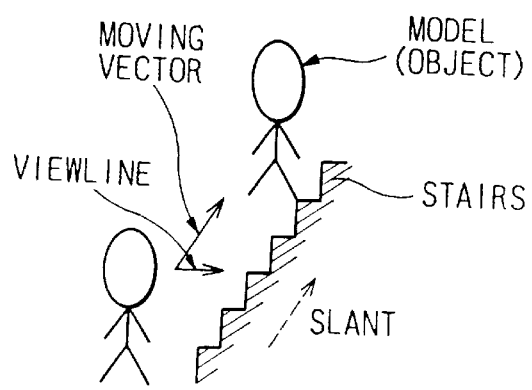
FIG. 2 is an explanatory view of a walk-through function in the computer graphics according to the present invention.

FIG. 2 is an explanatory view of a walk-through function in a computer graphics apparatus according to the present invention. When the walker goes up the stairs, only a "go" instruction is applied to the walker so that it is possible to go up the stairs without changing the viewline.

FIG. 3 is a block diagram of a computer graphics apparatus according to a first embodiment of the present invention. According to the first embodiment, the viewline data includes the shape of the object and the texture, and further includes the walk-through attribute data which are used when moving the viewline. Accordingly, it is possible to easily and smoothly move the object in the stairs and slope portion in accordance with forward/reverse instructions from the user.

In FIG. 3, reference number 11 denotes a user interface, 12 a viewline control unit, 13 a CG data file, 14 a display processing unit, and 15 a display unit. The user interface 11 receives an instruction from the user, and sends a request for movement of the viewline (below, walk-through request) to viewline control unit 12. The viewline control unit 12 includes a downward object search unit 12a, a movement vector calculation unit 12b and a viewline movement processing unit 12c, in order to calculate an amount of movement of the object located under the viewline along with a corresponding slant angle.

Further, the viewline control unit 12 performs an editing process of the viewline data (this process is a rewrite of the viewline data to new data) when moving the viewline in accordance a walk-through request. This editing process is executed for the CG data stored in the CG data file 13. Still further, the viewline control unit 12 again sends a request for display of the image to the display apparatus 14 after completion of the editing process of the viewline data.

The CG data file 13 stores three-dimensional object data as an attribute, for example, a floor, a desk, a lamp, etc., the viewline data indicating location and direction of the viewpoint, and environmental data indicating a direction of gravity.

The display processing unit 14 generates the two-dimensional image based on the data stored in the CG data storage file 13 when receiving the display request from the viewline control unit 12. The generated data is displayed on the display apparatus 15.

FIGS. 4A to 4D are explanatory views for explaining data stored in the CG data storage 13. FIG. 4A shows one example of the object data. The object data is formed by a name (for example, stairs), a shape, a texture, a walk-through attribute, etc. FIG. 4B shows one example of the walk-through attribute data. The walk-through attribute data is formed by the kind of object (for example, floor), and a normal line vector. The normal line vector of the floor is expressed by the coordinates (0,1,1). The walk-through attribute data includes various data, for example, the floor (an attribute on which the walker can walk), a wall (an attribute through which the walker cannot walk), and slant angles of the stairs.

FIG. 4C shows one example of the viewline data. The viewline data is formed by the coordinates of: a viewpoint (0,0,0), a notice point (0,0,100) and an up-vector (0,1,0) FIG. 4D shows one example of the environmental data. The environmental data is formed a gravity vector and is indicated by the vector (0,–1,0). This data indicates downward to the viewline. This is because a concept of "downward" is newly provided in the present invention since it is not provided in a conventional computer graphics.

Figure 5A:
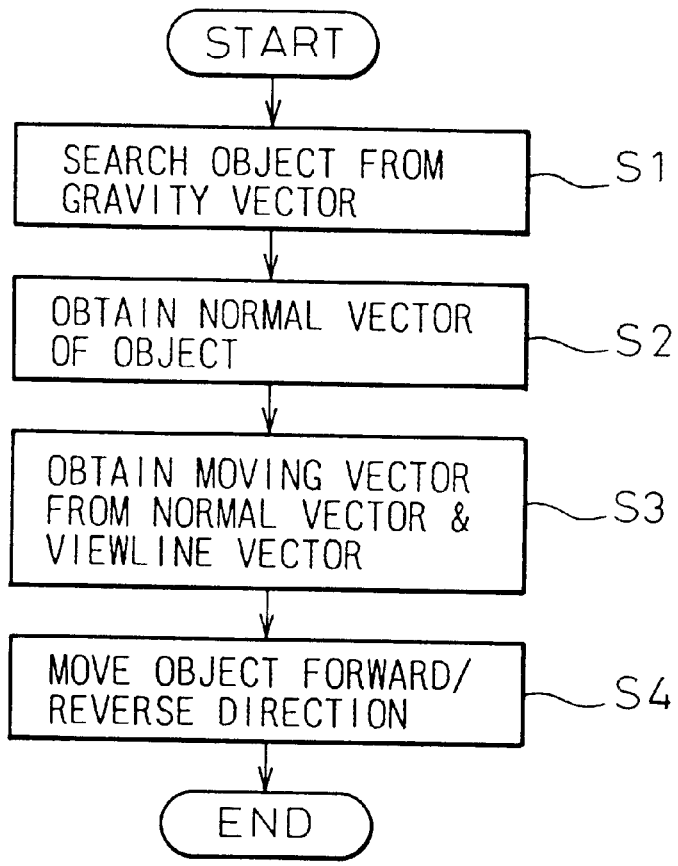
FIG. 5A is a process flowchart of the first embodiment shown in FIG. 3.
Figure 5B:
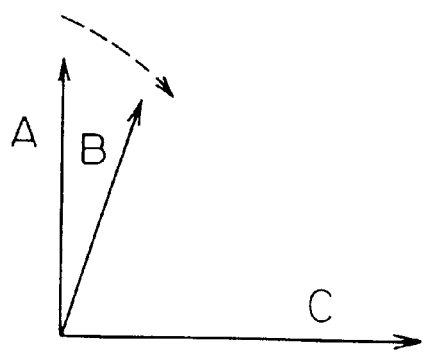
FIG. 5B is an explanatory view of calculation of a normal vector.

FIG. 5A is a process flowchart of the first embodiment shown in FIG. 3, and FIG. 5B is an explanatory view of calculation normal vector. In FIG. 5A, these processes show the case that the request of movement of the viewline in the forward/reverse direction is sent from the user interface 11 to the viewline control unit 12.

In step S1, the downward object searching unit 12a in the viewline control unit 12 searches object which is located downward from the coordinate (0,0,0) based on the gravity vector of FIG. 4D and the viewline data of FIG. 4C.

In step S2, the movement vector calculation unit 12b calculates the normal line of the object based on the walk-through attribute of the object which was searched in the step S1. When the object is expressed by the stairs of FIG. 4A, the normal line is given by the coordinates (0,1,1) of FIG. 4B.

In step S3, further, the movement vector calculation unit 12b calculates the movement vector based on the normal line and the viewline vector. That is, the viewline vector is calculated based on the viewpoint and the notice point of FIG. 4C (i.e., the viewline vector is given by the direction from the viewpoint to the notice point). Further, a lateral vector, which is perpendicular to the viewline vector and the upward vector of FIG. 4C, is calculated and expressed by the coordinates (1,0,0). Further, the movement vector is calculated from the lateral vector and the normal vector, and is perpendicular to the lateral vector and the normal vector.

In step S4, the viewline movement processing unit 12c moves the viewline data of FIG. 4D in the forward/reverse direction based on the movement vector calculated by the step (3). The moved viewline data is stored in the CG data storage unit 13.

As shown in FIG. 5B, "A", "B" and "C" are perpendicular vectors, and are expressed as follows. The vector C is perpendicular to both the vectors A and B. When A=(Xa,Ya,Za) and B=(Xb,Yb,Zb), the vector C=(Xc,Yc,Zc) is expressed as follows.

Xc=Ya×Zb−Za×Yb

Yc=Za×Xb−Xa×Zb

Zc=Xa×Yb−Ya×Xb

As is shown by a dotted arrow in the drawing and by the above calculation, the vector C is expressed by the vector in the right direction. When the vector A and the vector B are replaced with each other, the vector C changes to the reverse direction (i.e., left direction). According to above processes, it is possible to easily and smoothly move the object on the stairs and the slope portion.

FIG. 6A is a block diagram of a computer graphics apparatus according to a second embodiment of the present invention, and FIG. 6B is an explanatory view of viewline data. As shown in FIG. 6A, a viewline height adjusting unit 12d is further provided in the viewline control unit 12. The viewline height adjusting unit 12d searches the object of the floor attribute to the downward of the viewline after the viewline data is forwarded or reversed. In this embodiment, the viewline data includes the height data in order to adjust the height of the viewline. According to the height data, it is possible to easily and smoothly move the object along the stairs and a slope portion in accordance with only forward/reverse instructions from the user.

Figure 7A:
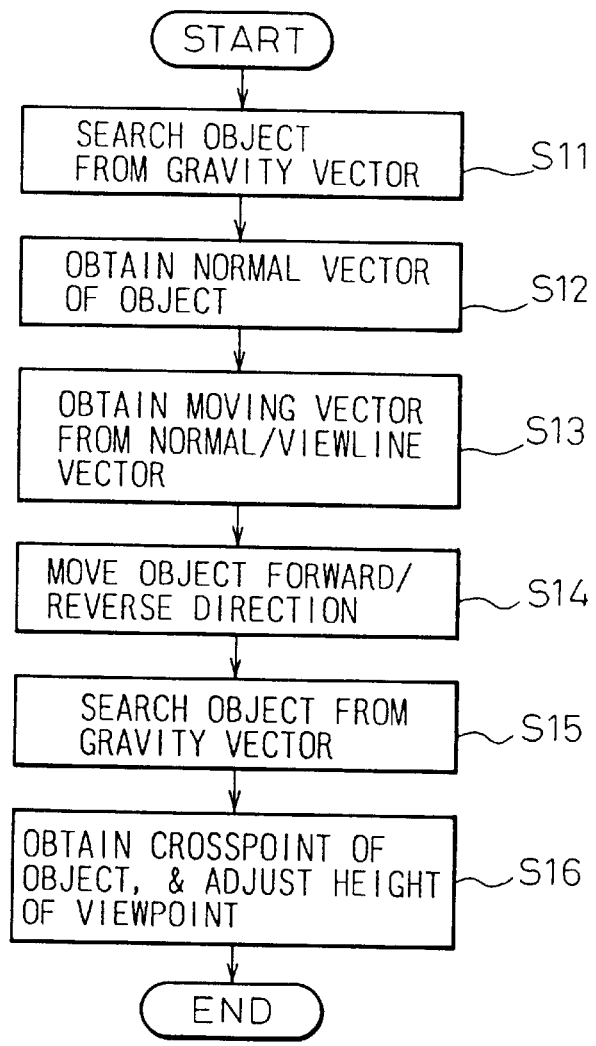
FIG. 7A is a process flowchart showing a process in a viewline control unit according to the second embodiment of FIG. 6.

FIG. 7A is a process flowchart at the viewline control unit according to the second embodiment of FIG. 6. This process shows the case where the request of movement of the viewline to the forward/reverse direction is sent from the user interface to the viewline control unit 12.

In step S11, the downward object searching unit 12a in the viewline control unit 12 searches the object which is located to the downward of the viewpoint (0,0,0) based on the gravity data and the viewline data of the environmental data.

In step S12, the movement vector calculation unit 12b obtains the normal vector of the object based on the walk-through attribute which is located by the search in step S11. When the located object is the stairs, the normal vector is expressed by the coordinates (0,1,1).

In step S13, the movement vector calculation unit 12b obtains the movement vector based on the normal vector and the viewline data which are calculated by the step (2). That is, calculation unit 12b calculates the viewline vector from the viewpoint and the notice point of the viewline data (i.e., the direction of the notice point from the viewpoint becomes the viewline vector), and further calculates a vector which is perpendicular to the viewline vector and the upward vector. The calculated vector is called the lateral vector having the coordinates (1,0,0). These steps S11 to S13 are the same as in the first embodiment.

In step S14, the viewline movement processing unit 12c moves the viewline data of FIG. 6B in the forward/reverse direction based on the movement vector of the step (3). The moved data is updated and stored in the CG data storage 13.

In step S15, the downward object searching unit 12a searches for objects which are located in the downward of the updated viewpoint based on the gravity vector of the environmental data and the updated data of FIG. 4D.

In step S16, the viewline height adjusting unit 12d checks the distance between the object and the viewpoint located in the step S15, and determines the distance as the height. Further, the adjusting unit 12d adjusts the height of the viewpoint so as to make the height of the viewpoint coincide with the height of the viewline data, for example, "5.0" of FIG. 6B.

Figure 7B:
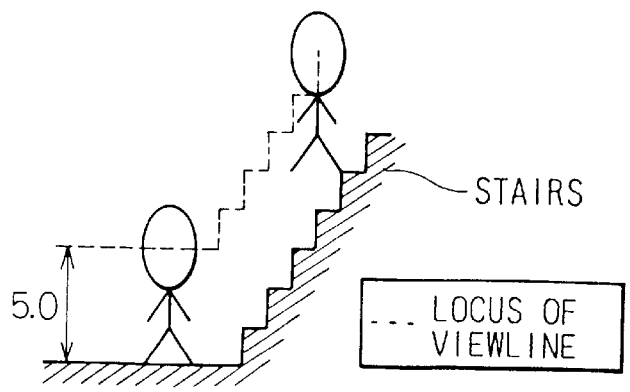
FIG. 7B is an explanatory view for explaining movement of viewline after adjustment of the height of the viewline in the second embodiment.

FIG. 7B is an explanatory view for explaining movement of the viewline after adjustment of the height of the viewline in the second embodiment. According to the second embodiment, the stairs can be expressed in a step-like form as shown by the dotted line.

Figure 8:
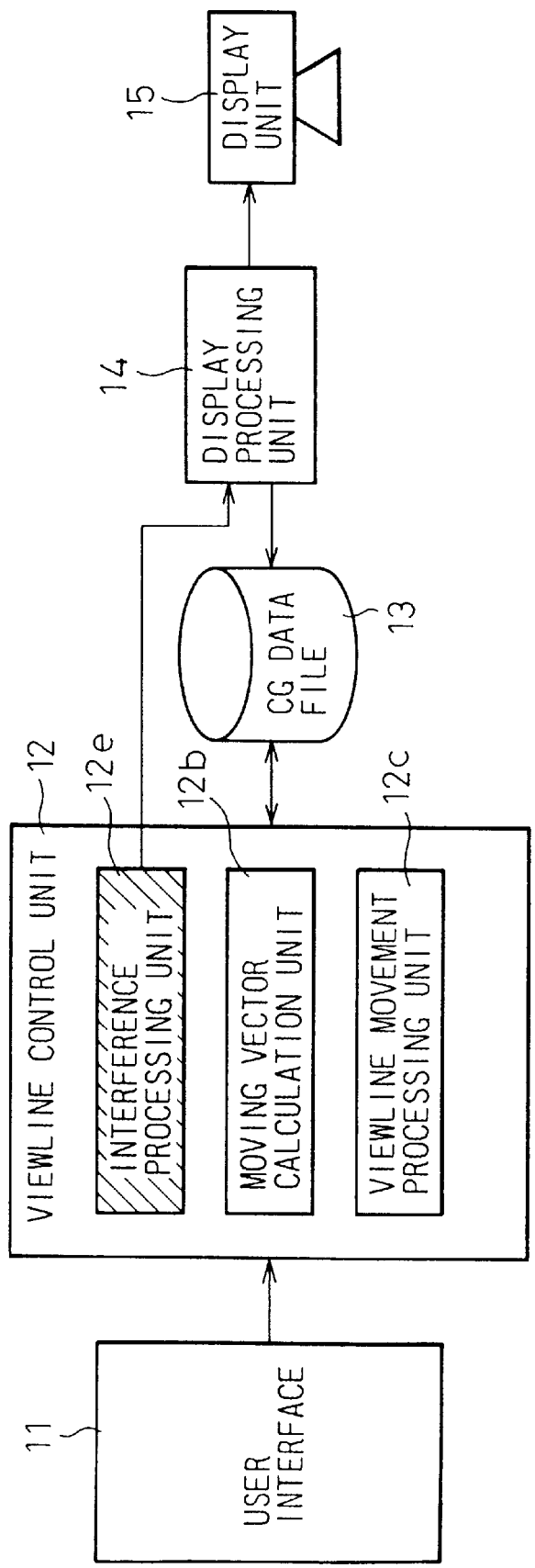
FIG. 8 is a block diagram of a computer graphics apparatus according to a third embodiment of the present invention.

FIG. 8 is a block diagram of a computer graphics apparatus according to a third embodiment of the present invention. In this embodiment, the walk-through attribute includes a "wall" as the attribute, and it is possible to move the viewline along the wall.

As shown in the drawing, an interference processing unit 12e is newly provided instead of the downward object searching unit 12a in the viewline control unit 12. The interference processing unit 12e checks for interference between the viewline and another object after the viewline is forwarded or reversed.

FIGS. 9A and 9B show example of the walk-through attribute data and the viewline data of the third embodiment. In FIG. 9A, the walk-through attribute data is formed by a kind (wall) and the normal vector having the coordinates (1,0,0). In FIG. 9B, the viewline data is formed by the viewpoint (0,0,0), the notice point (0,0,100), the upward vector (0,1,0), the height (5.0), and a radius of a view-volume (1.0). In this case, the view-volume is given by an expanded range of the viewline from the center in order to check the interference. Accordingly, when there is an object within the range of a sphere having the radius 1.0, interference occurs between the viewline and the object.

FIG. 10 is a process flowchart of a computer graphics apparatus according to the third embodiment.

In step S21, the viewline data, which indicates normal movement of the viewline, is moved in the direction of the viewline.

In step S22, the interference processing unit 12e performs calculation of the interference check between the object and the viewline data as the result of the step S21, and holds a list of the object which causes the interference.

In step S23, the interference processing unit 12e checks whether there are objects which cause interference as the result of the step S22. When there is interference (YES), the process goes to step S24. On the other hand, when there is no interference (NO), the process is completed. This process is for the case that there is no interference between the viewline and the object.

In step S24, the viewline is returned to the position before movement since the viewline within the view-volume radius (1,0) is forwarded to the object.

In step S25, the interference processing unit 12e checks the interference with the wall based on the result of the step S22. That is, the interference processing unit 12e checks the interference with the wall based on the walk-through attribute of the object which causes the interference. When there is interference (YES) with only the wall, the process goes to the step S26. When there is no interference (NO) with the wall, the process is completed after the viewline is returned to an original position since there is interference with other objects than the wall.

In step S26, the interference processing unit 12e calculates the movement vector based on the normal vector of the wall and the movement vector. First, the viewline vector is calculated based on the viewpoint and the notice point data of the viewline data. That is, a vector, which is perpendicular to the viewline vector and the normal vector of the wall, is calculated and this vector is called a "movement vector".

In step S27, the movement processing unit 12c moves the viewline data in the forward/reverse direction based on the movement vector which is obtained in the step S26.

According to the above processes, it is possible to move the viewline along the wall even if the viewline hits against the wall.

FIG. 11 is an explanatory view for explaining a sort table of an interference process according to a fourth embodiment. In the fourth embodiment, the objects are sorted into two types, i.e., objects which need to execute the interference check, or the objects which do not need to execute the interference check in accordance with the kind of the walk-through attribute in the interference processing unit 12e. As a result, it is possible to quickly perform the interference check. The objects which need to check the interference are, for example, a wall and a door. On the other hand, the objects which do not need to check are, for example, a desk, a chair, a floor, etc.

The flowchart of the fourth embodiment is the same as the third embodiment. However, the interference processing unit 12e of the viewline control unit 12 includes a sort table in order to sort either the walk-through attribute which needs to execute the interference check, or the walk-through attribute which does not execute the interference check. The interference processing unit 12e performs the interference calculation based on the sort table.

According to this embodiment, it is possible to realize the walk-through operation which ignores an object (desk, chair). This means that, when the walk-through hits the object, the walk-through can pass through the object.

FIG. 12A is a block diagram of a computer graphics apparatus according to a fifth embodiment of the present invention, and FIG. 12B is an explanatory view of viewline data according to the fifth embodiment. As shown in FIG. 12A, a viewline width adjusting unit 12f is newly added to the viewline control unit 12 of the third embodiment shown in FIG. 8. When the viewline data is interfered to the wall, the viewline width adjusting unit 12f obtains the distance from the normal vector of the wall to the viewline, and adjusts the viewline data to a constant width from the wall.

In the fifth embodiment, the viewline data includes the width data so that it is possible to easily and smoothly move the walk-through along the wall holding the constant distance from the wall, even if the wall is curved, in accordance with only instructions of the forward/reverse direction from the user.

FIG. 12B is an explanatory view for explaining the viewline data according to the fifth embodiment. The viewline width is newly added to the viewline data of the third embodiment of FIG. 9B. When the viewline is interfered to the wall, the viewline moves based on the width "1.0" in accordance with the viewline data.

Figure 13:
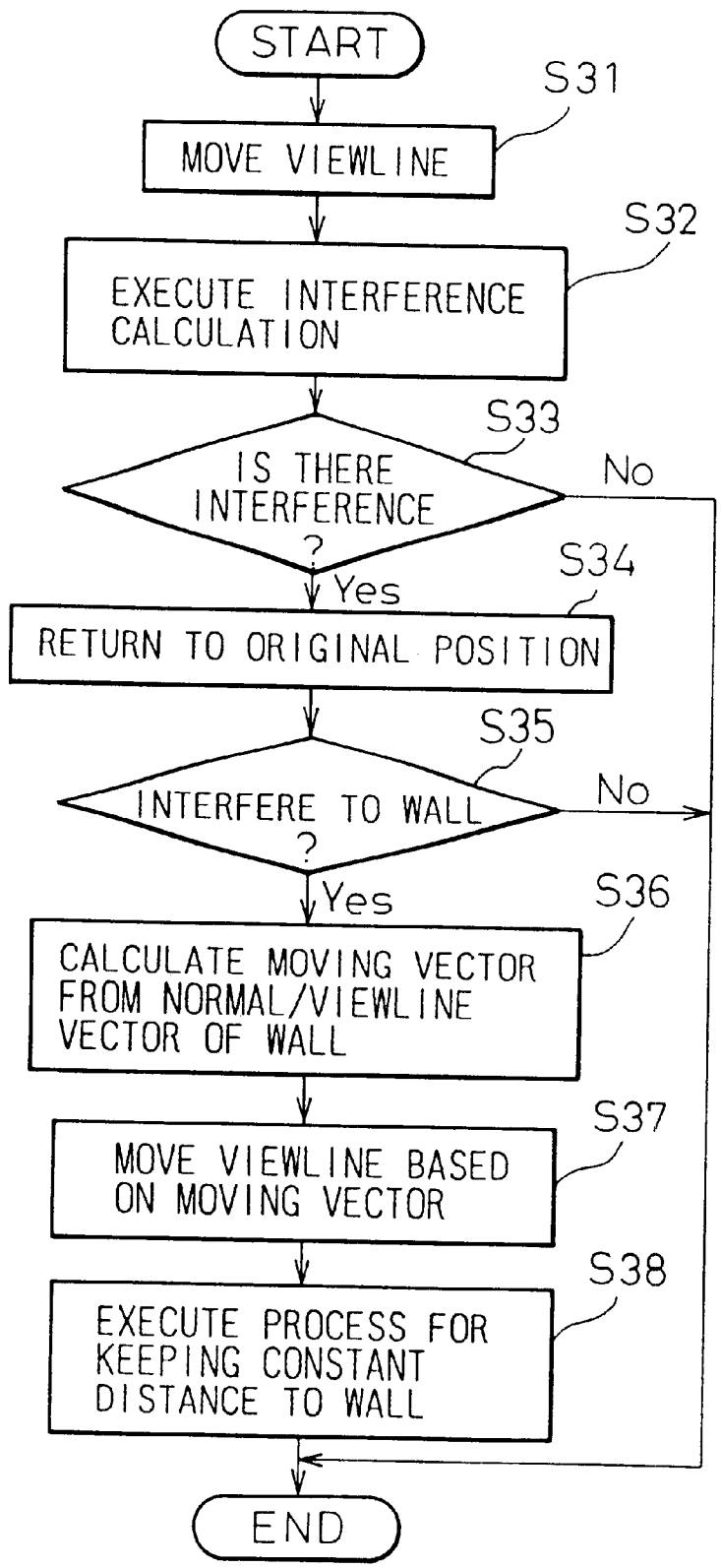
FIG. 13 is a process flowchart of a computer graphics apparatus according to the fifth embodiment.

FIG. 13 is a process flowchart of a computer graphics apparatus according to the fifth embodiment. This process is for the case that the request of movement of the viewline in the forward/reverse direction is generated from the user interface 11 to the viewline control unit 12.

In step S31, the viewline data, which is for normal movement of the viewline, is moved in the viewline direction.

In step S32, the interference processing unit 12e executes the interference check between the object and the viewline data as a result of the step S31. Further, the interference processing unit 12e holds a list of the objects which are interfered.

In step S33, the interference processing unit 12e checks whether there are objects which are interfered to the viewline as the result of the step S32. When there is interference (YES), the process goes to the step S34. When there is no interference (NO), the process is completed.

In step S34, the viewline is returned to the position before movement since the viewline of the view-volume having the radius "0,1" is included within the object.

In step S35, the interference processing unit 12e checks the interference to the wall based on the result of the step S32. This is checked by the interference with the wall based on the walk-through attribute of the object. When the viewline is interfered with only the wall (YES), the process goes to the step S36. When the viewline is interfered with the wall (NO), the process is completed.

In step S36, the interference processing unit 12e calculates the movement vector based on the normal vector from the wall and the viewline data. That is, the viewline vector is obtained from the viewpoint and the notice point of the viewline data so as to be perpendicular to the viewline vector and the normal vector of the wall. The calculated vector is called "movement vector".

In step S37, the movement processing unit 12c moves the viewline data in the forward/reverse direction based on the movement vector which is obtained by the step S36.

In step S38, the viewline width adjusting unit 12f checks the distance between the viewpoint and the wall which is located by the step S32, and adjusts the width of the viewpoint so as to make the distance from the viewpoint of the wall coincide with the width of the viewline data ("1.0" of FIG. 12B). The resultant data are stored in the CG data storage unit 13. As explained above, the viewline can move along the wall holding the constant distance from the wall even if the wall is curved.

Figure 14:
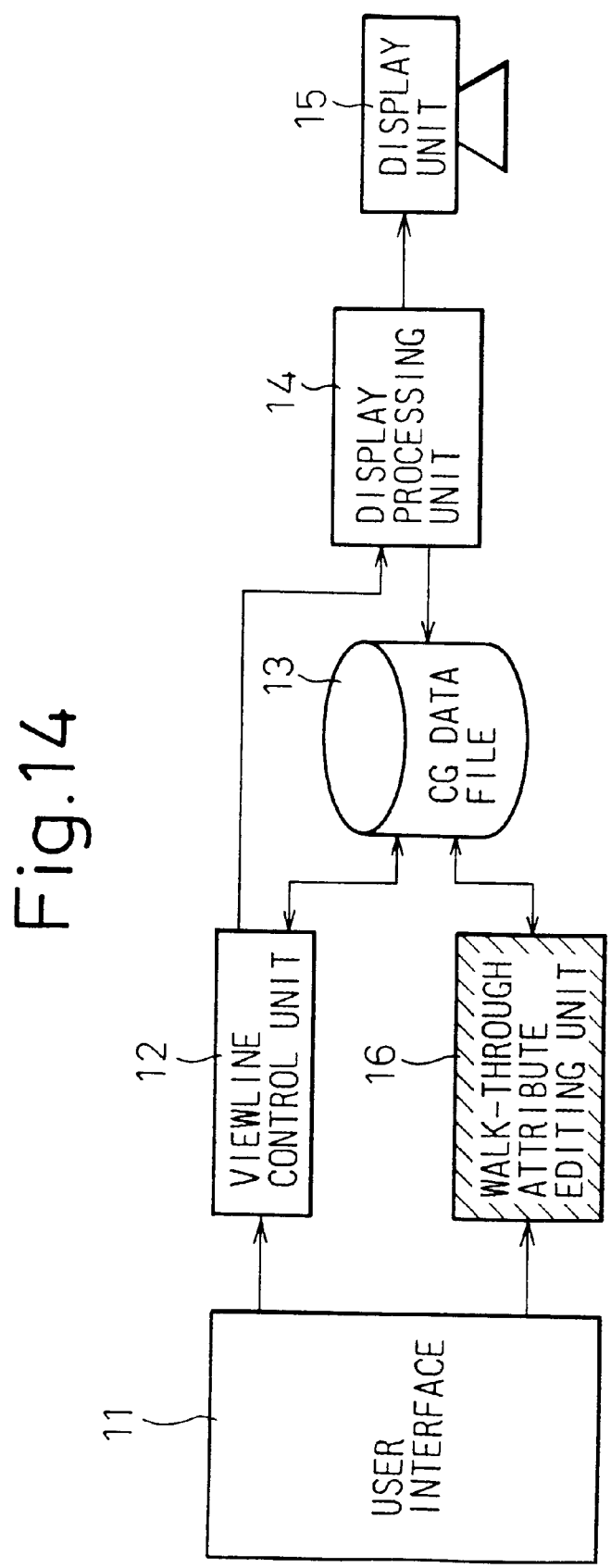
FIG. 14 is a block diagram of a computer graphics apparatus according to a sixth embodiment of the present invention.

FIG. 14 is a block diagram of a computer graphics apparatus according to a sixth embodiment of the present invention. As shown in the drawing, a walk-through attribute editing unit 16 is further provided for freely setting (changing) the walk-through attribute by the user through the user interface 11. The setting data are stored into the CG data storage 13. The movement of the viewline (walk-through) is the same as the fifth embodiment.

According to this embodiment, the user can edit the walk-through attributes and the sort table for the interference check so that it is possible to flexibly draw the three-dimensional object on the display. The walk-through attribute includes, for example, the attribute which the walker can walk, the attribute which the walker cannot walk, the attribute which needs to check the interference, and the attribute which does not need to check the interference.

The following explanations are given for the second aspect of the present invention. This invention relates to a method and apparatus for estimating processing time to display an animated image in accordance with expected time.

Recently, high performance CG accelerators have been developed and utilized for computer graphics so that it is possible to generate an animated image at high speed and in real time. This accelerator raises new subject which needs to coincides a display expectation time with an actual display time. Particularly, in the animated image, if the animated image cannot be displayed in accordance with a setting time, it is very difficult to obtain an animated image which is very close to an actual motion.

In a conventional art, when generating a CG animated image in real time, the CG animated image is displayed after it has been processed (calculated) in a predetermined constant time interval. However, in general, the generation time of a CG animated image is different from for every frame length of the CG animated image. Accordingly, if the generation time of the CG animated image is longer than the predetermined constant time interval, it is impossible to display the CG animated image at the setting time so that the motion of the animated image becomes stiff.

Therefore, the present invention aims to perform expectation of the generation time of the CG animated image at high speed in order to display the image in accordance with expected time. According to the present invention, it is possible to generate a-desired image after expectation time was passed.

FIG. 16 is an explanatory view for explaining processing time for expectation, calculation, and display in a computer graphics apparatus according to the second aspect of the present invention. As shown in the drawing, there are three processes for generation of a CG animated image, i.e., an expectation process, a calculation process and a display process. The calculation process is provided for determining, for example, coordinates of a three-dimensional object. The display process is provided for drawing a two-dimensional object based on the three-dimensional object along a predetermined viewline, and executing color calculation for each points of the two-dimensional object.

The processing time T for one frame is given by the expectation process time T1, the calculation processing time T2 and the display processing time T3. The expectation processing time T1 can be measured before calculation so that it is possible to expect the calculation processing time T2 and the display processing time T3. In this case, it is necessary to set the expectation time T1 as short as possible in order to shorten the total process time T for one frame and to generater smooth animated image.

The calculation processing time T2 depends on an amount of calculation which depends on complexity of calculation and the number of changes of motion, changes of color, etc. Accordingly, the expectation time for the calculation processing time is performed by estimating an amount of calculation.

The display processing time T3 depends on, for example, a "shading method" which calculates various elements, for example, the numbers of polygons (number of faces of cubic object), textures, faces, peaks, and normal lines in the three-dimensional object. Accordingly, the expectation for the display processing time is performed by checking the number of above elements.

In the second aspect of the present invention, the state of the three-dimensional data is checked for every step in order to expect the calculation time T2 and display time T3. In this case, various parameters, which are dependent on a system structure (i.e., hardware/software structure) and are necessary for calculation of processing time depending on the numbers of polygons, are previously determined.

The following processes are given to explain the expectation time T1. The shorter this time, the better, as explained above.

(1) Checks change of an amount of calculation (for example, start/stop of movement) and change of a time-change calculation method (for example, a key-frame interpolation method explained below) at the current time, and expects the calculation processing time T2 based on the above result of change.

(2) Checks change of an amount of three-dimensional data (for example, addition/deletion of data, change of shape and attribute of object, etc.) at the present time, and expects the display processing time T3 based on the result.

(3) Checks the display processing time as follows. In this case, the display processing time T3 depends on two cases, i.e., one depends on the numbers of all data defined, and the other depends on the numbers of data within view-volume which represents an area displayed. In this case, all data within the view-volume must be checked as to whether each data is contained therein or not in accordance with each coordinate. Accordingly, a large processing time is required for calculation. Further, since the view-volume is frequently changed, it is necessary to check the above for every change. The above problems can be resolved by the following processes.

a) When the data are not changed (stopped), the data within the view-volume are approximated as the same data as the previous state. In this case, the processing time for the data, which is not changed within the view-volume, employs the time which was needed in the just previous state (i.e., previous actual time). On the other hand, the data, which are changed (moved), are checked as to whether they were included within the view-volume for every time, and the processing time is calculated in accordance with change of the data. This step is effective for a normal walk-through function in which the view-volume is not changed quickly compared to the previous state.

b) Divides a display space into a plurality of partial spaces when the data are not changed, and checks the numbers of data within each partial space. When the view-volume is changed, partial spaces contained in the view-volume are checked. When the data are changed, the data are checked as to whether they are contained within the view-volume for every time, and a change in the processing time is checked. This process is effective for a state in which it cannot be confirmed that the view-volume is not changed quickly compared to the previous state.

c) When the data are not changed, the display processing time is calculated based on a volume ratio of the view-volume which is occupied in all spaces. When the data are changed, the data are checked as to whether they are contained within the view-volume for every time, and the change of the processing time is calculated. This step is effective for the state in which the data are uniformly arranged and in which an amount of data is not changed quickly due to a change of the viewline in the same view-volume. That is, this step is effective in the following cases. When the viewline is moved vertically, the change of the amount of data is large. However, when the viewline is moved horizontally, the change of the amount of data is slight. For example, the walk-through operation is performed by passing through the structures, it is not necessary to direct the viewline up/downward.

Further, the processing speed for generation of the CG image is changed due to an external factors, for example, a change of the hardware and change of load on a CPU (central processing unit). Accordingly, the processing speed is expected as follows.

(1) The processing speed of the CPU is changed in accordance with the change of the load. In order to reflect the change of the load, the previous expectation time and the actual time are reflected to the expectation. For example, when the processing time was estimated slightly long in the previous expectation, the next is estimated slightly short.

(2) In order to reflect the difference of the processing time caused by the performance of the hardware, parameters which determine the processing time (for example, processing time per one polygon, change of processing time caused by a difference of shading method) are previously checked and stored.

(3) Parameters for each hardware can be automatically measured by using a predetermined command based on test data which is previously determined.

Based on the above processes, the calculation processing time T2 can be expected based on estimation of an amount of calculation, and the display processing time T3 can be expected based on an amount of data and counting of the numbers of kinds of data. As explained above, it is possible to shorten the calculation expectation time and display expectation time by estimating an amount of data from the change of previous data and change of display data.

In the expectation of the display processing time, particularly, since the view-volume is changed dynamically, a previous check thereof is very difficult so that it is difficult to perform expectation at high speed. For this problem, calculation of the processing time of the data contained in the view-volume is approximated as the same processing time as the previous frame regarding the data which are not changed. Further, the information for data are previously provided for each space in order to calculate the data in the view-volume. Still further, calculation is performed based on the volume ratio between the view-volume and all spaces.

When the data are changed, the data are checked as to whether there are the data within the view-volume so that it is possible to perform expectation at high speed.

For example, in an image processing enabling multi-image processing such as a UNIX, since the processing time depends on use of the CPU by another application program, it is difficult to perform exact expectation. For this problem, the load state of the CPU is reflected to the result of expectation in order to reflect the previous expectation and the actual time.

Still further, parameters used for expectation for each hardware are previously provided and maintained, and it is possible to perform expectation by taking into account the performance of the hardware.

Still further, the parameter measuring unit is provided for expectation. The test data is held to obtain parameters used for expectation, the processing time at the test data is measured to obtain the parameters.

Based on above processes, it is possible to perform expectation of the processing time for the CG animated image at high speed, and to shorten one frame time T so that it is possible to generate smooth animated image in the computer graphics apparatus.

FIG. 17 is a basic block diagram of an image processing unit in a computer graphics apparatus according to the present invention. In FIG. 17, an animation processing unit 22 includes an expectation processing unit 221, a control unit 222, a data storage unit 223, an animation processing unit 224, and a display processing unit 225. An external storage file 21 stores three-dimensional data for the CG animation. The data storage unit 223 stores three-dimensional data, expectation parameters, etc.

Brief operation of the image processing device 22 is explained as follows. Initially, the three-dimensional data, which are necessary for generating the CG animation, are transferred from the external storage unit 21 to the data storage unit 223 in accordance with instructions from the control unit 222. Next, the expectation processing unit 221 expects the calculation processing time T2 and the display processing-time T3 for the CG animation based on the three-dimensional data and the expectation parameters in the data storage unit 223 in accordance with a schedule for generating the CG animation, and expects total processing time for the CG animated image.

Next, the animation processing unit 224 executes calculation for the CG animation after above expectation time, and the result is displayed through the display processing unit 23.

As mentioned above, since the processes are executed, i.e., expects the processing time for the CG animated image and generates the animated image after above expectation time, it is possible to display the animated image at the expected time even if the processing time for the CG animation is changed.

Figure 18:
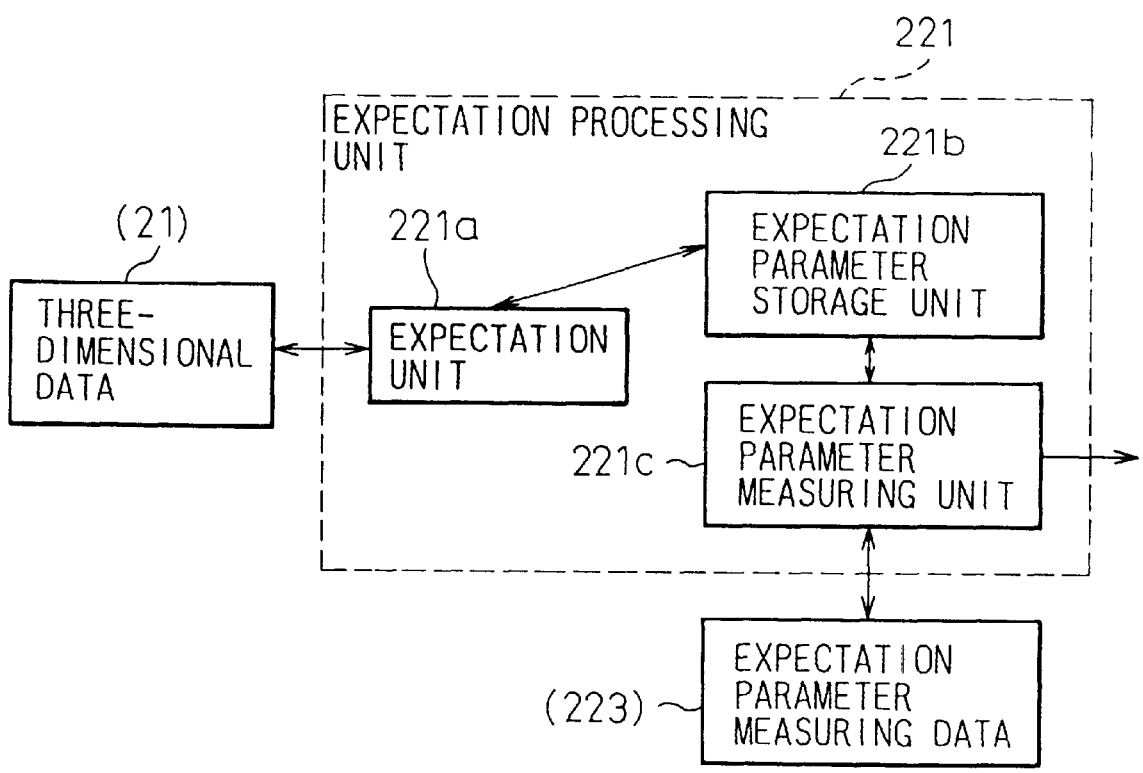
FIG. 18 is a detailed structure of an expectation processing unit shown in FIG. 17.

FIG. 18 shows a detailed structure of the expectation processing unit 221 shown in FIG. 17. The expectation processing unit 221 is formed by an expectation unit 221a, an expectation parameter storage unit 221b and an expectation parameter measuring unit 221c. The expectation unit 221a receives the expectation parameters from the expectation parameter unit 221b, reviews the three-dimensional data from the data storage unit 21, and expects the calculation processing time T2 and the display processing time T3 using these data.

The expectation parameter storage unit 221b stores the expectation parameters in accordance with kinds of hardware (for example, a CG accelerator). The expectation parameter measuring unit 221c measures the time which is required for calculation/display of the data using the expectation parameter data stored in the data storage unit 223, obtains the expectation parameter, and stores the result into the expectation parameter storage unit 221b.

Figure 19:
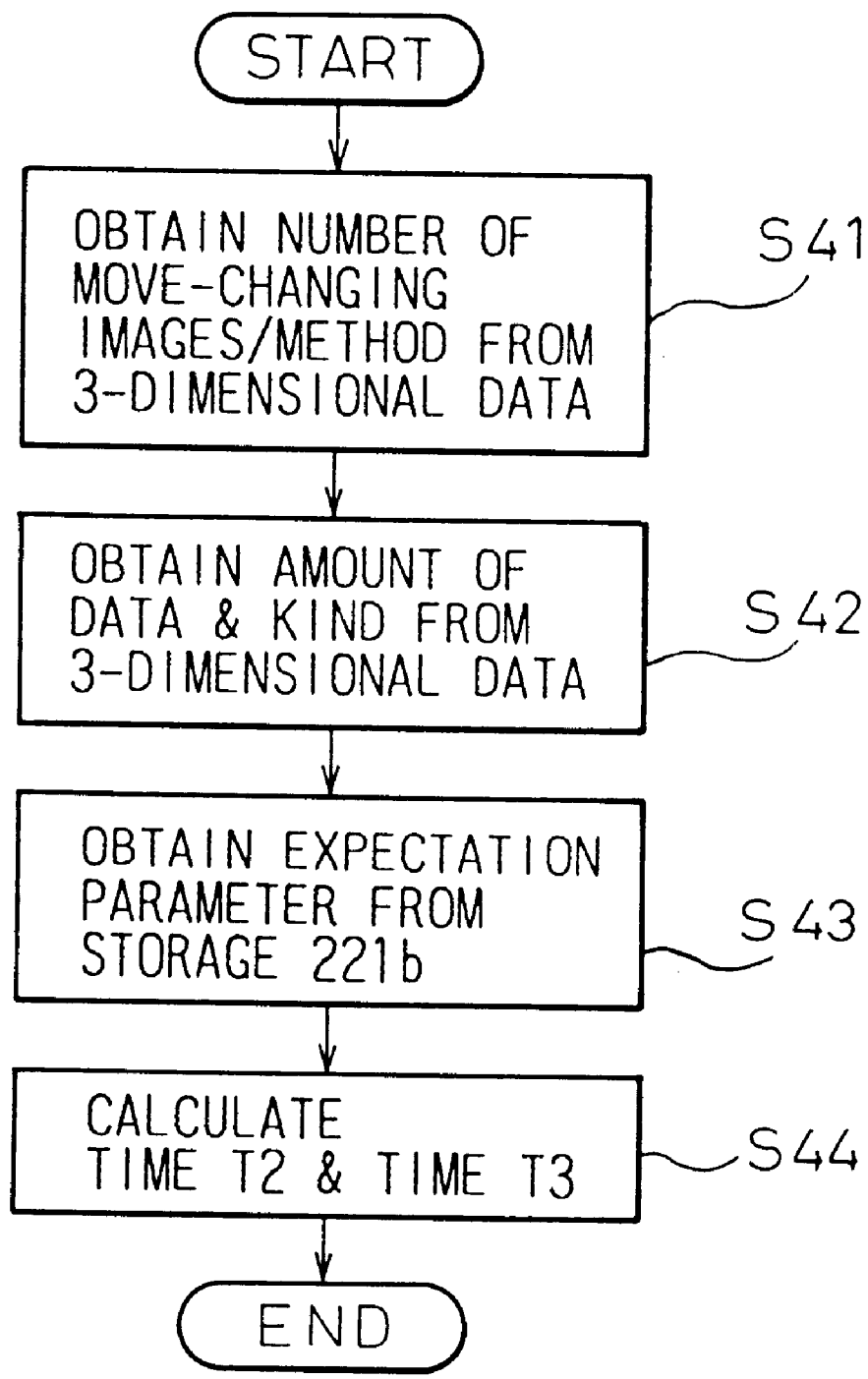
FIG. 19 is a basic process flowchart of FIG. 17.

FIG. 19 is a basic process flowchart of FIG. 17.

In step S41, the expectation unit 221a obtains the number of move-changing images (for example, an animated image) and the number of move-changing methods (for example, a keyframe interpolation method and kinematics method) in accordance with time from the three-dimensional data.

In step S42, the expectation unit 221a obtains an amount of data (for example, the numbers of polygons) and kinds thereof from the three-dimensional data.

In step S43, the expectation unit 221a obtains the expectation parameters from the expectation parameter storage unit 221b.

In step S44, the expectation unit 221a calculates the calculation processing time T2 and the display processing time T3 based on the three-dimensional data and the expectation parameters.

One example of calculation of the calculation processing time T2 and the display processing time T3 is explained in detail below.

For example, it is assumed that the following data are obtained form each step. That is, in step S41, the numbers of data which change based on a keyframe interpolation method of color of the three-dimensional data, are "A", and the numbers of data which change based on kinematics method in accordance with the change of time, are "B"; in step S2, the numbers of all polygons are "C", the numbers of the polygons within the view-volume are "D", the numbers of all textures are "E", the numbers of the textures within the view-volume are "F", and the shading method is given by "glow-shading". Further, in step S43, the expectation parameter storage unit 221c previously stores an amount of calculation for every time-changing method, and numerals indicating affected to the display processing time T3 for every kinds of data.

In the above case, the expectation time for the calculation processing time T2 of the CG animated image is expressed as follows.

ETC=(IP×A+KI×B)×UT

Where, ETC is an expectation time for calculation processing time T2, IP is an amount of calculation for color keyframe interpolation, KI is an amount of calculation for change based on the kinematics, and UT is a time necessary for calculation at unit hour.

On the other hand, the expectation time for the display processing time T3 is expressed as follows.

ETD=APT+VVT

Where, ETD is an expectation time for display processing time T3, APT is a processing time for all data, and VVT is a processing time for data within the view-volume.

It is assumed that: the information concerning all processes are given by only the number of polygons; the information concerning processes within the view-volume are given by the numbers of polygons and textures, and the shading method; the processing time is required for the polygons and textures in proportional to the number thereof; and the processing time is changed in accordance with the shading method (for example, the processing time for the glow-shading method is required for processing time of 1.2 times compared to a flat-shading method). The processing time for all data (TA) is given as follows.

TA=C×Ta

TB=(D×Ta+F×Tb×K)

Where, TA is the processing time for all data, Ta is the processing time per one polygon, TB is the processing time for all data within the view-volume, Tb is the processing time per one texture, and K is the coefficient based on the shading method.

Figure 20:
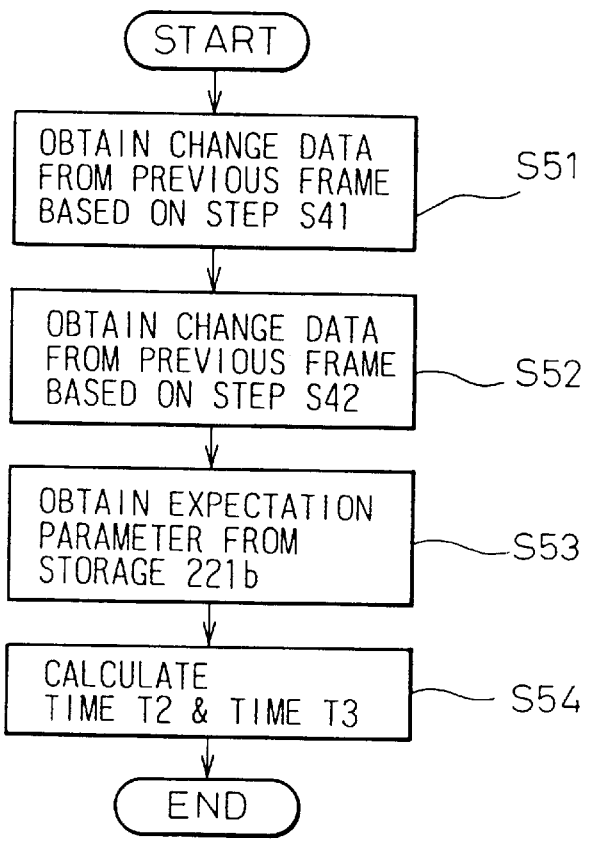
FIG. 20 is an expectation process flowchart based on change information from previous frame.

FIG. 20 is an expectation process flowchart based on change information from the previous frame.

In step S51, the expectation unit 221a obtains change information (data) which are changed from the previous frame regarding the number of move-changing images (for example, an animated image) and the number of move-changing methods (for example, a keyframe interpolation method) in accordance with time from the three-dimensional data.

In step S52, the expectation unit 221a obtains change information which is changed from the previous frame regarding an amount of data (for example, the number of polygons) and kinds thereof from the three-dimensional data.

In step S53, the expectation unit 221a obtains the expectation parameter from the expectation parameter storage unit 221b.

In step S54, the expectation unit 221a calculates the calculation processing time T2 and the display processing time T3 based on the three-dimensional data and the expectation parameters.

As explained above, the expectation unit 221a calculates the change (plus/minus) of the processing time based on the change information which are changed from the previous frame in steps S51 and S52, and estimates the calculation processing time T2 and the display processing time T3 at high speed by taking into account the actual processing time and the change of the processing time. The formulas are expressed as follows. In this case, when the change is decreased, the result of the formula becomes "minus".

(calculation processing time) T2=(previous calculation time)+ (present change of amount of calculation)×(calculation time per unit amount of calculation)

(display processing time) T3=[(processing time at previous number of polygons)+(change of processing time based on number of polygons)+(processing time at previous number of textures)+(change of processing time based on number of textures)]×[coefficient ratio at present/previous shading method]

Figure 21:
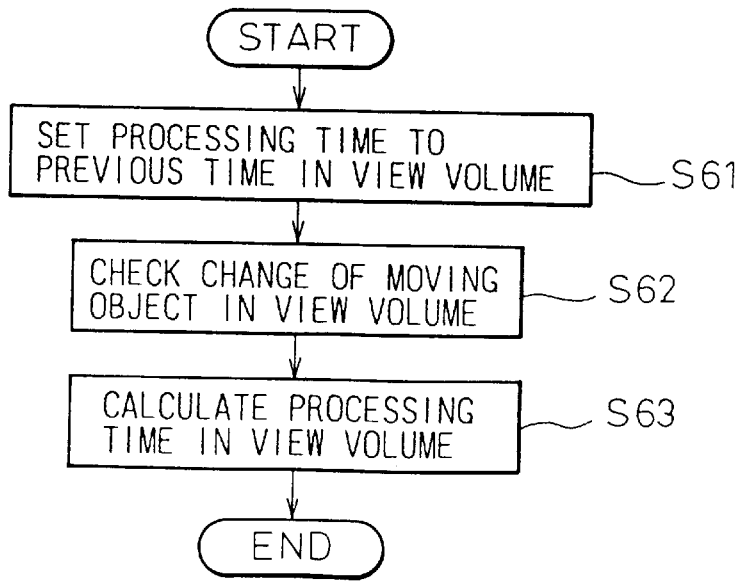
FIG. 21 is an expectation flowchart for a processing time in a view-volume.

FIG. 21 is an expectation flowchart for the processing time within a view-volume.

In step S61, first, the processing time for a non-moving object within the view-volume is set to the same time as the previous processing time.

In step S62, the expectation unit 221a checks for a change (plus/minus) of the moving object in the view-volume.

In step S63, the expectation unit 221a calculates the display processing time T3 in the view-volume. This calculation is expressed as follows.

(processing time in view-volume)=(processing time for non-moving object (i.e., previous actual value))+(change of processing time based on change of number of moving objects in view-volume)

Figure 22A:
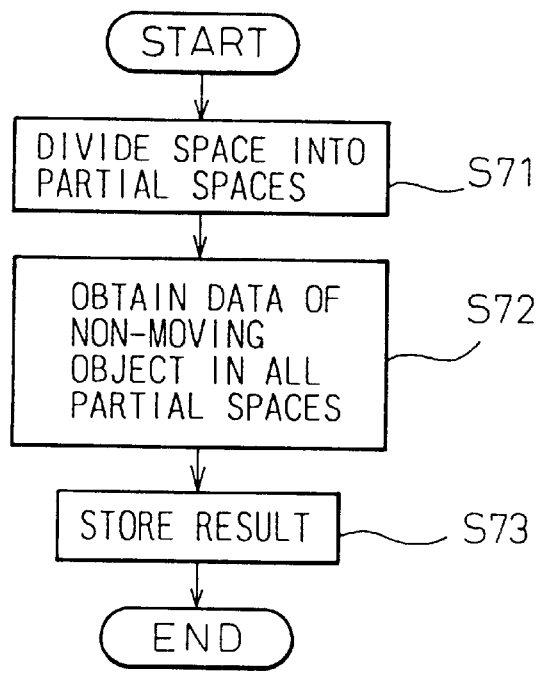
FIGS. 22A and 22B are another expectation flowcharts for the processing time in the view-volume.
Figure 22B:
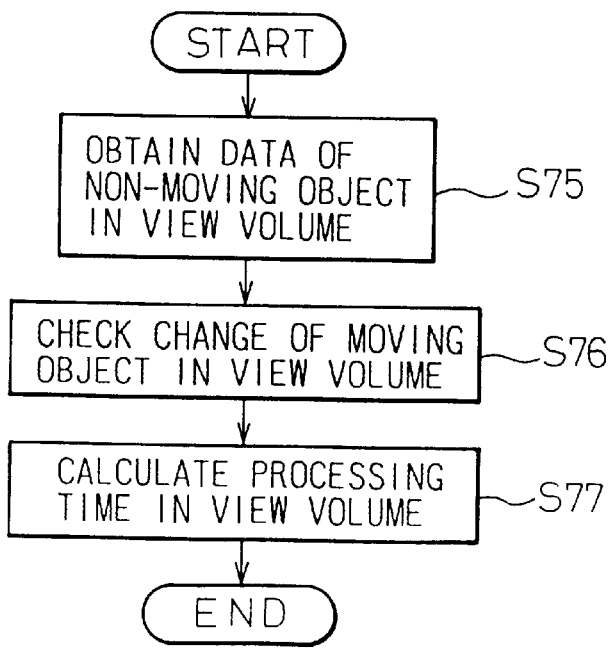

FIGS. 22A and 22B are another expectation flowchart for the processing time in the view-volume. FIG. 22A shows processes for an initialization.

In step S71, the expectation unit 221a divides a whole space, which is defined previously, into a plurality of partial spaces.

In step S72, the expectation unit 221a obtains data of non-moving objects in all partial spaces, for example, the numbers of polygons, the numbers of textures, etc.

In step S73, the results of the step S72 are stored in the expectation parameter unit 221b.

FIG. 22B shows processes for every step.

In step S75, the expectation unit 221a obtains data of a non-moving object in the view-volume by adding data of non-moving objects in all partial spaces contained therein.

In step S76, the expectation unit 221a checks plus/minus of moving object in the view-volume.

In step S77, the expectation unit 221a calculates the processing time in the view-volume.

The calculation is executed based on the following formula.

(processing time in view-volume)=(processing time for non-moving objects in view-volume)+(change of processing time based on plus/minus of the numbers of moving object in view-volume)

Figure 23:
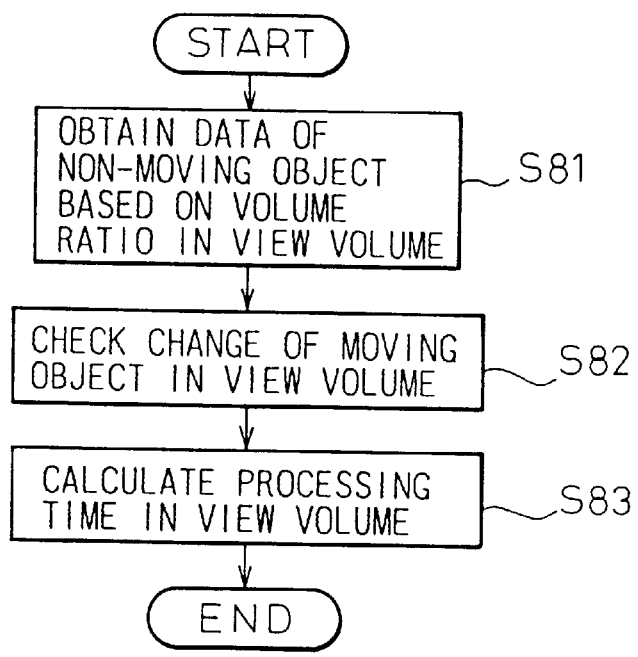
FIG. 23 is a still another expectation flowchart for the processing time in the view-volume.

FIG. 23 is a still another expectation flowchart for the processing time in the view-volume.

In step S81, the expectation unit 221a obtains data of a non-moving object in the view-volume by calculating a volume ratio which the CG animation occupies in whole space.

In step S82, the expectation unit 221a checks plus/minus of the numbers of the moving objects in the view-volume.

In step S83, the expectation unit 221a calculates the processing time in the view-volume.

The calculation is executed based on the following formula.

processing time in view-volume)=(processing time for moving objects in view-volume)+(change of processing time based on plus/minus of moving object in view-volume)

Figure 24:
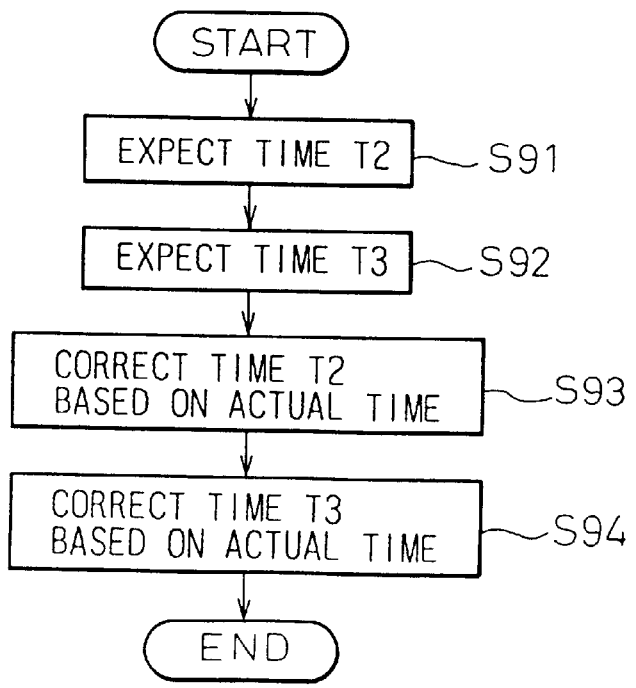
FIG. 24 is a correction flowchart for correcting previous expectation time and actual processing time.

FIG. 24 is a correction flowchart for correcting a previous expectation time and actual processing time.

In step S91, the expectation unit 221a expects the calculation processing time T2.

In step S92, the expectation unit 221a expects the display processing time T2.

In step S93, the expectation unit 221a corrects the expectation time of the calculation processing time T2 based on the difference between the previous calculation time and the actual processing time.

The expectation time is corrected as follows.

(corrected expectation time of calculation time T2)=(expectation time of previous/actual calculation times)×(expectation time of present calculation time)

In step S94, the expectation unit 221a corrects the expectation time of the display processing time T3 based on the difference between the previous calculation time and the actual processing time.

The expectation time is corrected as follows.

(corrected expectation time of display time T3)=(expectation time of previous/actual display time)×(expectation time of present display time)

FIG. 25 is a measuring process flowchart for expectation parameters.

In step S101, the expectation parameter measuring unit 221c reads a display reference data and a parameter decision data from the data storage unit 223.

In step S102, the display processing unit 225 displays the display reference data on the display unit 23.

In step S103, the display processing unit 225 obtains the display time of the display reference data by measuring the start time and the end time of the display time.

In step S104, the parameter decision data is displayed on the display unit 23. In this case, data provided for each parameter is displayed one-by-one on the display unit 23.

In step S105, the display processing unit 225 obtains the display processing time of the parameter decision data. In this case, the display processing time is measured for every display of the data provided for each parameter.

In step S106, the display processing unit 225 obtains the expectation parameter for display. For example, the parameter which indicates the processing time per one polygon is calculated as follows.

This calculation is executed as follows.

(parameter)=[(display processing time for the parameter decision data)-(display processing time for the display reference data)]/[(number of polygons for the parameter decision data)-(number of polygons for the display reference data)]

In step S107, the expectation parameter measuring unit 221c executes a measuring program of the expectation parameter for calculation. One example of the measuring program is prepared for calculating a change of time based on the keyframe interpolation method for color of the object, and the other is prepared for calculating movement of a joint of the object by using a skeleton.

In step S108, the expectation parameter measuring unit 221c measures the calculation time of the program which was executed in the step S107.

In step S109, the expectation parameter measuring unit 221c obtains the expectation parameters. For example, in the change of color for every time by using the keyframe interpolation method, the parameters indicating the processing time are calculated as follows.

(parameter)=(processing time of program for calculating change of time by using keyframe interpolation for color)/(number of colors)

What is claimed is:

1. A computer graphics method, comprising:
    calculating display coordinates for stored three-dimensional data of an object based upon viewline position;
    displaying an animated image based on the calculated display coordinates; and
    determining a total processing time by estimating a calculation processing time for said calculating of display coordinates, estimating a display processing time for said displaying of the animated image, and estimating an expectation processing time for said estimating of said calculation processing time and said display processing time, with the total processing time being generated by summing the estimated expectation processing time, the estimated calculation processing time and the estimated display processing time.

2. A computer graphics method according to claim 1, further comprising:
    obtaining an amount of data and kinds of data from the three-dimensional data;
    obtaining expectation parameters which are previously determined based on the amount of data and the kinds of data; and
    calculating the estimated calculation processing time and estimated display processing time based on the expectation parameters.

3. A computer graphics method according to claim 1, wherein said displaying of the animated image includes displaying the animated image in a first frame, and estimating the display processing time in accordance with change of an amount of data and kinds of data from a frame prior to the first frame.

4. A computer graphics method according to claim 1, further comprising the steps of:
    obtaining previously determined expectation parameters; and
    calculating calculation processing time and display processing time based on the previously determined expectation parameters.

5. A computer graphics method according to claim 4, further comprising:
    setting the estimated expectation processing time for non-moving objects in a view-volume to a previous estimated expectation processing time of a previous view volume;
    checking a change of a number of moving objects in the view-volume; and calculating the estimated calculation processing time in the view-volume using the change of the number of moving objects in the view-volume.

6. A computer graphics method according to claim 1, further comprising:

calculating a volume ratio of a volume of the three-dimensional data and a view-volume;

calculating expectation data using the volume ratio; and estimating a total processing time from the expectation data.

7. A computer graphics method according to claim 1, further comprising:

determining a difference between a previous estimated expectation processing time and an actual expectation processing time; and correcting the estimated expectation processing time in accordance with the difference.

8. A computer graphics method according to claim 1, further comprising:

reading reference data;

displaying the reference data obtaining a time to display the reference data;

displaying parameter decision data;

obtaining a time to display the parameter decision data;

reading expectation parameters;

executing a problem using the expectation parameters in a calculation process;

obtaining a time to calculate the calculation process; and correcting the expectation parameters in accordance with the calculation process.

* * * * *

UNITED STATES PATENT AND TRADEMARK OFFICE
CERTIFICATE OF CORRECTION

PATENT NO. : 6,587,106 B1  
APPLICATION NO. : 09/021409  
DATED : July 1, 2003  
INVENTOR(S) : Kaori Suzuki et al.

Page 1 of 1

It is certified that error appears in the above-identified patent and that said Letters Patent is hereby corrected as shown below:

In the Specification, column 1, line 6:
Please delete "Mar. 17, 1992" and insert -- Mar. 17, 1995 --

Signed and Sealed this
Twenty-first Day of June, 2011

David J. Kappos
*Director of the United States Patent and Trademark Office*